United States Patent [19]

Arnold et al.

[11] 4,357,309

[45] Nov. 2, 1982

[54] GASEOUS REAGENT GENERATOR

[75] Inventors: Sara J. Arnold, Medicine Hat; Kenneth D. Foster, LacBeauport, both of Canada

[73] Assignee: Her Majesty the Queen in right of Canada, Ontario, Canada

[21] Appl. No.: 240,158

[22] Filed: Mar. 3, 1981

[30] Foreign Application Priority Data

May 12, 1980 [CA] Canada ................................. 351948

[51] Int. Cl.³ .............................................. C01B 7/18
[52] U.S. Cl. ................................ 423/486; 423/658.5; 423/659; 422/199; 422/211; 422/231; 422/235; 422/239; 372/55
[58] Field of Search ..................... 423/486, 659, 658.5; 422/199, 211, 227, 230, 231, 235, 238, 239, 261, 263, 288; 331/94.56

[56] References Cited

U.S. PATENT DOCUMENTS

| | | | |
|---|---|---|---|
| 875,186 | 12/1907 | Kirkwood | 422/238 |
| 1,380,067 | 5/1921 | Kah et al. | 422/227 X |
| 1,921,564 | 8/1933 | Cottrell | 423/505 |
| 3,619,144 | 11/1971 | Bawa et al. | 422/193 |

OTHER PUBLICATIONS

Hoffman, "Anhydrous Hydrogen Iodide", *Inorganic Synthesis*, vol. VII, McGraw-Hill Book Co., New York, 1963, pp. 180-183.
Arnold et al., "A Purely Chemical HCl Laser", *Appl. Phys. Lett.*, vol. 30, No. 12, Jun. 15, 1977, pp. 637-639.
Arnold et al., "A Purely Chemical HBr Laser", *Appl. Phys. Lett.*, vol. 33, No. 8, Oct. 15, 1978, pp. 716-717.

*Primary Examiner*—Earl C. Thomas
*Attorney, Agent, or Firm*—Stevens, Davis, Miller & Mosher

[57] ABSTRACT

An apparatus and method for generating on demand a gaseous product from a liquid phase reaction of one reactant in the solid phase at ambient room conditions and another reactant in the liquid phase at ambient room conditions. The reactants preferably are iodine crystals, and liquid tetrahydronaphthalene (THN), with the gaseous product being hydrogen iodide. The liquid phase reaction, in the preferred embodiment, is $2I_2 + C_{10}H_{12} \rightarrow 4HI + C_{10}H_8$, known per se. Preferably, THN is pumped from a reservoir to be sprinkled over the iodine crystals in another reservoir. Some iodine dissolves into the liquid THN, with the resulting solution then percolating through a reaction zone containing a heated, porous packing material. Heat is transferred to the solution, thereby promoting, i.e., driving the above reaction. The gaseous hydrogen iodide is then removed from the reaction zone; typically for direct use, for example, in a chemical laser. The gaseous HI is generated at sufficiently high flow rates and/or partial pressures to be used in chemical lasers, eg., based on HF, HCl or HBr which operate at about 2700 nm, 3800 nm, and 4100 nm, respectively.

20 Claims, 3 Drawing Figures

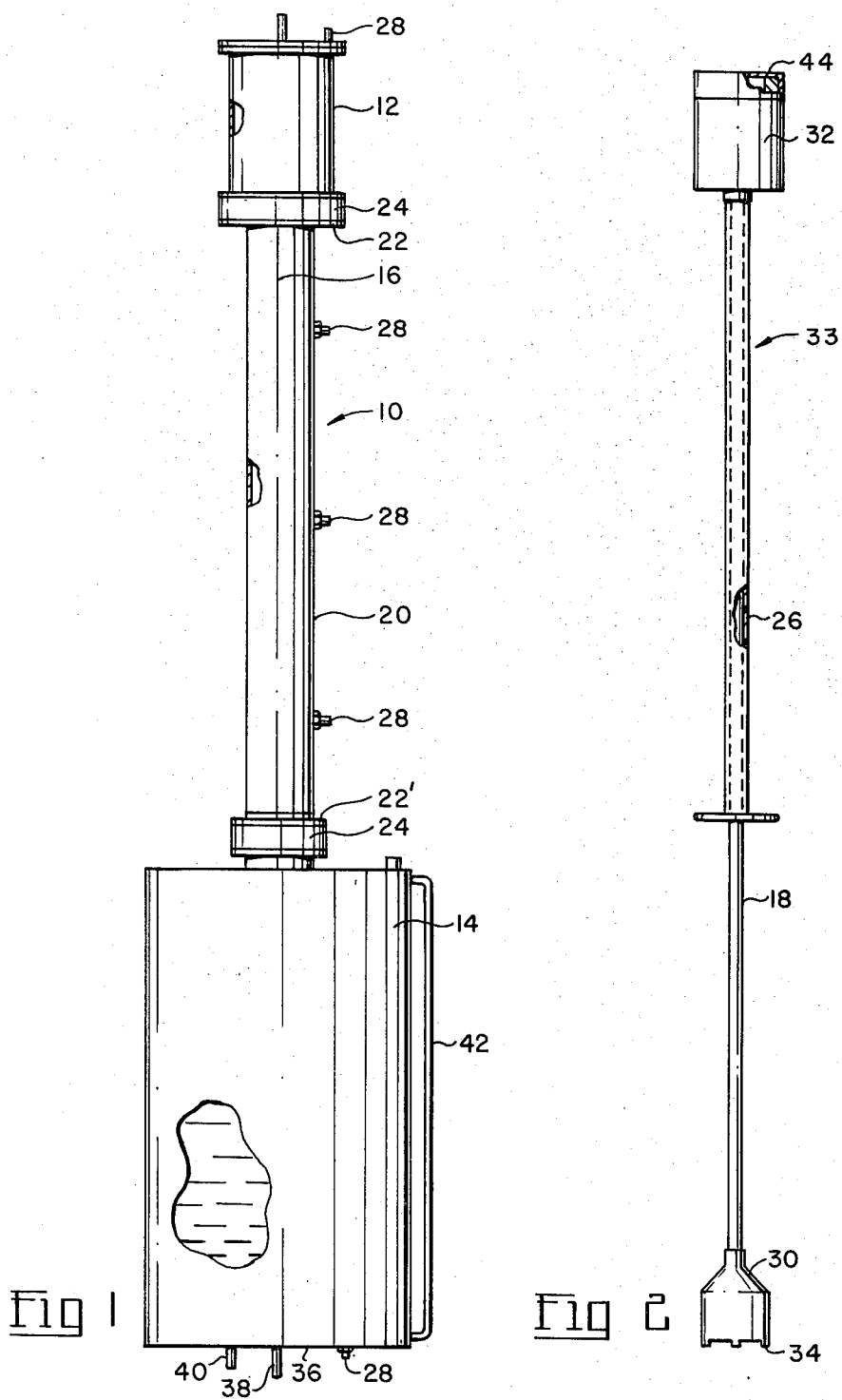

GASEOUS REAGENT GENERATOR

This invention relates to a method and apparatus for generating a gaseous product from a liquid phase reaction of two reactants. More specifically, a gaseous product such as hydrogen iodide (HI) is generated by reacting iodine dissolved in liquid tetrahydronaphthalene (THN) at a moderately elevated temperature.

BACKGROUND OF THE INVENTION

One of the principal present day uses of hydrogen iodide is as a reagent in operating a chemical laser. These lasers include the important class of infrared (IR) lasers, based on the lasing action of vibrationally excited hydrogen fluoride (HF); hydrogen chloride (HCl); or hydrogen bromide (HBr). Such lasers operate, respectively, at wavelengths around 2700 nm, 3800 nm, and 4100 nm. Possible pumping reactions for these lasers are:

$$F + HI \rightarrow HF + I \quad (1)$$

$$Cl + HI \rightarrow HCl + I \quad (2)$$

$$Br + HI \rightarrow HBr + I \quad (3)$$

For more details relating to such lasers and reactions, the reader is referred to (1) S. J. Arnold and K. D. Foster, D. R. Snelling and R. D. Suart, "A Purely Chemical HCl Laser", Appl. Phys. Lett. vol. 30 pp. 637–639, 1977.

(2) S. J. Arnold, K. D. Foster, "A Purely Chemical HBr Laser" Appl. Phys. Lett. vol. 33 pp. 716–717, 1978.

There have been problems in the development of (chemical) lasers that use HI as a reagent. These have arisen from factors such as the high cost of commercially available HI, the limited shelf life thereof, and safety hazards associated with the storage of an appreciable quantity of a corrosive gas such as HI. Thus, there has remained a need for an inexpensive, reliable "on demand" technique or method of producing quantities of HI that is adequately pure and available in sufficient flow rates.

The liquid phase reaction of iodine with tetrahydronaphthalene (THN)

$$2 I_2 + C_{10}H_{12} \rightarrow 4 HI + C_{10}H_8 \quad (4)$$

which converts iodine almost quantitatively to HI was the process chosen for the production of anhydrous HI. See the following text:

C. J. Hoffman, "Anhydrous Hydrogen Iodide", Inorganic Syntheses vol. 7 pp. 180–181, 1963. This process has the advantage of requiring only moderate temperatures (200°–210° C. at 760 torr pressure) and of using common industrial chemicals which are relatively easy to handle and store as starting materials.

The process as described in the literature employs the dropwise addition of a very dilute solution of iodine in THN to a large volume of boiling THN. The present generator described herein overcomes the problem of the low solubility of iodine in THN and the necessity of boiling a large volume of liquid.

SUMMARY OF THE INVENTION

The foregoing clearly indicates that although the chemistry is known, per se, the prior art production of gases such as HI does have shortcomings.

It is, therefore, an object of a preferred embodiment of this invention to provide a method, and apparatus, for generating gaseous hydrogen iodide, on demand, so as to avoid the need to store large quantities of the same.

It is also an object herein to generate a gaseous reagent such as hydrogen iodide reliably and relatively inexpensively.

Accordingly, by one aspect of this invention, there is provided a method for generating a predetermined gaseous product, derived from chemically reacting at least two reactants, at least one of the reactants being in a liquid phase at ambient room conditions and at least one of the remaining reactants being in a solid phase at the ambient conditions, the method comprising (a) introducing the reactant in liquid phase into the supply of the reactant in the solid phase, at least some of the solid reactant dissolving into the liquid reactant to form a reactive solution (b) percolating the reactive solution through a reaction zone heated to a preselected temperature above ambient; said heat driving a predetermined chemical reaction occurring in the reaction zone to produce the gaseous product; and (c) removing the gaseous product from the reaction zone to another location where the product is in demand.

By another aspect of the invention, there is provided an apparatus for generating a gaseous reagent, upon demand, from the chemical reaction of at least two reactants, at least one of the reactants being in a liquid phase at ambient room conditions and at least one of the other reactants being in a solid phase at the ambient room conditions; the apparatus comprising: (a) a first reservoir for containing the solid reactant and a second reservoir for containing the liquid reactant, the reservoirs being spaced apart; (b) a reaction zone located intermediate the first and second reservoirs, the reaction zone including means causing precolation of a solution of the solid reactant dissolved in the liquid reactant through the zone to enable the chemical reaction to occur, thereby producing the gaseous reagent; (c) heating means for providing heat to the reaction zone, the heating means being operative to maintain a temperature in the zone less than a temperature at which the solution would boil; and (d) conduit and pumping means operable to convey the liquid reactant to the first reservoir, the conduit means including an arrangement for removing the gaseous product to another location where the product is in demand.

In a preferred form of the invention, the liquid reactant is tetrahydronaphthalene, the solid reactant is iodine and the gaseous product is hydrogen iodide. More preferably still, a gas such as nitrogen or argon is supplied under pressure to drive the liquid reactant into the first reservoir, and also to remove or flush the gaseous product from the reaction zone to the point of use.

In a still more preferred form, this invention envisages a portable apparatus for generating gaseous hydrogen iodide on demand, by chemically reacting iodine and tetrahydronaphthalene (THN) in a liquid phase reaction, comprising, (a) a first reservoir for containing the iodine in a solid state; (b) a second reservoir for containing the THN in a liquid state, the reservoirs being spaced apart and interconnected by conduit means operative to enable the liquid THN to be delivered to the first reservoir on demand; (c) a tubular housing for containing at least a portion of the conduit means to define a reaction zone, the housing also being interconnected to the first and second reservoirs to define therewith a substantially closed system, the reaction zone including therein a heated porous packing through which a solution of iodine dissolved in the THN is percolated, thereby enabling the liquid phase reaction of the iodine and THN to proceed, thus generating the gaseous hydrogen iodide, the gaseous hydrogen iodide being removed from said zone and conveyed by a carrier gas to the point of use.

These and other characteristics and features of the present invention will become more apparent from the detailed description below. That should be read in conjunction with the attached drawings which refer specifically to a preferred embodiment of an apparatus encompassed by the invention.

DESCRIPTION OF THE DRAWINGS

In the drawings:

FIG. 1 is an elevation view showing a preferred form of apparatus embodied herein;

FIG. 2 is also an elevation view to illustrate some of the features of an internal sub-assembly of the apparatus of FIG. 1.

DETAILED DESCRIPTION OF THE PREFERRED EMBODIMENTS

Figure 3:
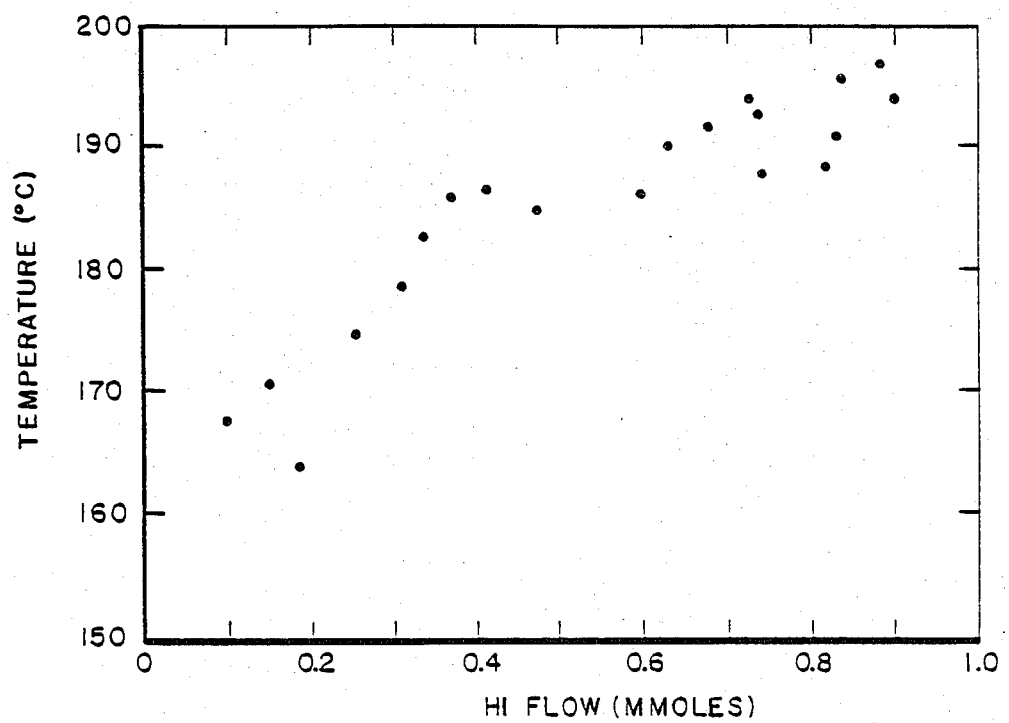
FIG. 3 is a graph to illustrate the rate of production of hydrogen iodide as a function of temperature, using the apparatus of FIG. 1.

It is to be noted initially, and in general terms, that a gaseous product such as HI is generated from a solution of a solid reactant such as iodine in solution with a liquid reactant such as tetrahydronaphthalene (THN). The liquid reaction is splashed/sprinkled over the solid reactant to enable some of the latter to dissolve into the former, thus forming a solution. This solution is heated by percolating it through a reaction zone containing a heated porous packing. Gaseous HI is generated from the chemical reaction described at (4) above, that reaction occurring in the liquid phase. The gaseous HI is removed and conveyed by a carrier gas from the reaction zone to the point of use. In those instances where the solid reactant has a low or limited solubility in the liquid reactant, recirculation of the unreacted liquid reactant would be desirable. Recirculation could thus produce a saturated solution, in our preferred case of $I_2$ in THN.

Turning now to FIG. 1, a gas generating apparatus as envisaged herein is shown overall at 10. The apparatus 10 will be described specifically with reference to generating gaseous hydrogen iodide (HI) from solid iodine ($I_2$) and liquid tetrahydronaphthalene (THN). The apparatus 10 includes a first reservoir 12 or saturator for solid crystals of iodine, a second reservoir 14 for containing the liquid THN and a reaction zone 16. These elements are made of a suitable material joined together to form a closed system which is capable of evacuation. The reaction zone 16 is defined by the space between two concentric conduits or tubes 18 (FIG. 2) and 20. The outermost tube 20 is connected by sealing its opposite ends 22 and 22' to the reservoirs 12 and 14 which are consequently positioned at spaced apart locations. Spacers 24 made of a non-heat conducting material such as "TEFLON" (a Trademark of the Dupont Company for a polytetrafluoroethylene) are included in the connections 22 and 22' to reduce the transfer of heat away from the reaction zone 16. A similar non-heat conducting material is applied as shown at 26 in FIG. 2 to the exterior of the innermost tube 18 to insulate the same. Further reference to this will occur below.

Although not specifically shown, the reaction zone 16 contains porous heat conducting packing material, such as one piece, or chips, of copper. This packing material is retained in place by a screen supported by the end 22' of the tube 20. The purpose of the packing material is to increase the dwell time in the reaction zone 16, and to effect the transfer of heat into the solution percolating through it. In this way the surface area of the falling liquid exposed to the inert carrier gas is large for a given volume of falling liquid. This facilitates the passage of product HI into the gaseous phase where it is swept away by a carrier gas. The violent 'bumping' of liquid in a large boiling pot is thereby avoided. This will be described below in more detail.

The packing material is heated, as by electrical heaters (not shown) thermostatically controlled by a number of thermocouples 28. These maintain the temperature of the packing material and reaction zone 16 below the boiling temperature of the liquid reactant. In this way, the input of heat is more effectively used in raising the temperature of the packing and liquid thereon, rather than in heat primarily for evaporation.

Returning to FIG. 2, the tube 18 is connected at one end to a cup-like recirculator or pumping means 30, and at its other end to a basket like container 32 for the solid iodine, typically in the form of crystals. These parts are made of a suitable material joined together. Such parts form a sub-assembly identified at 33. It will be evident that the sub-assembly 33 of FIG. 2 is contained within the reservoirs 12 and 14 and tube 20. The latter are normally connected after insertion therein of the sub-assembly 33. The cup-like pumping means 30 includes feet 34 which are to be positioned in a centrally located circular groove provided in a bottom floor 36 of the reservoir 14. In this way, the sub-assembly of FIG. 2 is accurately centered and stabilized in position. Further, an opening 38 is also provided in the floor 36, centrally of the reservoir 14 to enable a gas such as argon or nitrogen (the carrier or pumping gas noted above) to be introduced into that reservoir. A closeable drain outlet 40 is provided in the floor 36. It is to be recognized here, that the subassembly 33 of FIG. 2 resembles and functions superficially in a manner similar to the recirculator/percolator assembly of a household percolating coffee pot. A liquid level indicator may also be attached to the reservoir 14, for instance comprising a transparent tube communicating with the interior of reservoir 14 near the top and bottom thereof, as indicated in FIG. 1 at reference numeral 42. The level of the liquid in reservoir 14 may be ascertained by observing the corresponding level in the tube.

In the present invention, however, the reservoir 14 and its contents (THN) are not heated. Moreover, a suitable gas (argon or nitrogen as already mentioned) is introduced through inlet 38 to be collected momentarily under the cup-like recirculator pumping means 30, to pump or drive liquid reactant (THN) up the inner tube 18. Upon reaching the basket like container 32, the THN is splashed or sprinkled over the iodine in the same, i.e., in the first reservoir 12. In this respect the tube 18 projects upward a distance equal to the depth of container 32 so that the liquid upon exiting from the tube may hit the underside of the splash cap 44 thus splashing or sprinkling over the iodine.

The graphical results shown in FIG. 3 were derived from operation of an apparatus 10 whose specific description and operation is as follows.

The liquid container 14 was 20 cm in diameter and 35 cm in height. The base of that container had inlets 38 for the inert gas used to provide the recirculating action, for a thermocouple 28, and for the drain 40. The interior of the container floor 36 had a circular groove to accept the feet 34 of the recirculator 30 thus ensuring that the recirculator was always centered over the gas inlet 38. A water cooled condenser separate from apparatus 10, and not shown herein, removed any THN and/or iodine vapor carried over in the gas stream. The reaction zone 16 was 43 cm long and 5 cm in diameter. A copper mesh screen was placed at the bottom of the zone 16 to support the packing which filled the zone. This packing consisted of 0.16 cm diameter, 1.5 cm long pieces of copper rod. Thermocouples 28 were placed at the center and 7.5 cm from the top and bottom of the reaction zone 16. The iodine saturator 12, was 7.6 cm in diameter and 10 cm in height. It was closed with a brass top plate 44 which had a thermocouple inlet and an outlet to a pressure gage. Both the iodine saturator 12, and the liquid container 14 had water cooling coils (not shown) covering their exterior surfaces. The recirculator consisted of a copper tube 18, 0.78 cm in diameter and 95 cm in length which terminated in a conical section leading to a 5 cm diameter, 5 cm long cup-like base 30. Four feet 34, 0.5 cm in height supported the recirculator and centered it in the groove in the floor 36 of container 14. To thermally insulate the recirculator tube 18 from the reaction zone, the tube was covered with a tight fitting TEFLON sleeve 26, 0.16 cm thick. An iodine container 32, 6.8 cm in diameter and 6.7 cm in height, was placed on the top 10 cm of the recirculator tube 18. The container 32 was covered with a splash plate 44 to deflect the liquid THN downward onto iodine crystals in the container. The bottom of the container 32 was perforated with 100 holes 1 mm in diameter. The iodine required for the reaction was placed in the container 32 at the start of the run.

The generator apparatus 10 was designed to operate at above atmospheric pressure, but could be evacuated. The pressure was controlled by a needle valve located at the exit of the condenser (not shown). As noted earlier, apparatus 10 formed a closed system.

Chromel-alumel thermocouples 28 were used to measure the temperature in the reaction zone, the iodine saturator and the liquid container. The thermocouple in the center of the reaction zone was connected to a Thermo Electric Temperature Controller which controlled the 1500 W metal coil refractory heaters surrounding the top 18 cm of the tube 20 of reaction zone 16. Fire brick insulation was placed over the heaters and the unheated bottom section of the reaction zone 16 so that the entire reaction zone was fully enclosed.

The exit from the condenser (not shown) led to a quartz absorption cell, a trap filled with a suitable absorbing solid for trapping HI, a liquid nitrogen trap, and a vacuum pump.

The liquid container 14 was filled with a THN/$I_2$ solution (237.5 g iodine in 9.5 l THN) and an additional 763 g of iodine was placed in the saturator cup 32. Nitrogen at a flow rate of 3000 sccm was used to recirculate the solution. To ensure a liquid phase reaction the pressure in generating apparatus 10 was maintained at 1400 torr. At time t=0 (reaction zone temperature T=15° C.), the heaters were switched on with the temperature controller set to 210° C. At t=15 min (T=160° C.) HI production commenced. A maximum steady state rate of production of HI of 0.9 mmol/s was achieved at t=44 min (T=197° C.). This rate of production lasted for 45 minutes. FIG. 3 shows a graph of this HI production as a function of temperature. The temperature in the iodine saturator 32, 12 did not exceed 57° C., ensuring that the majority of the iodine remained as a low vapor pressure solid until it dissolved. The maximum temperature in the liquid container 14 was 22° C.

Examination of the apparatus interior after several experiments revealed a whitish green deposit on the copper surfaces, but little evidence of corrosion.

The concentration of HI was measured by absorption spectroscopy at 253.7 nm. The absence of absorption at 253.7 nm due to THN was confirmed in a blank experiment with pure THN and no iodine.

In order to ascertain that the HI produced was suitable for use in an HCl chemical laser, the HI was run directly from the condenser exit into a supersonic HCl laser. This is described in the paper of S. J. Arnold, K. D. Foster and D. R. Snelling, "Performance and Diagnostic Measurements of a Supersonic HCl Chemical Laser", J. Appl. Phys., vol. 50, pp. 1189–1194, 1979. The laser had previously been aligned using commercial HI. The output power was 0.1 W for a flow of 0.6 mmol/s of commercial HI. With generated HI, the same output power was obtained for essentially the same HI flow (as measured by 253.7 nm absorption). This test indicates that the generator apparatus 10 described above is capable of producing HI of sufficient purity for use in HCl chemical lasers.

The present generator is capable of use with either CW or pulsed chemical lasers. As demonstrated above, HI from the generator performed as satisfactorily as commercial HI in a CW laser. For pulsed lasers operating at high pulse repetition frequencies (PRF), the HI could be generated 'on demand' as it is for CW lasers. For those pulses lasers operating at low PRF, the generated HI could be trapped and stored on a short term basis in a bulb or cylinder.

It may also be possible to recycle the product iodine from the chemical laser back into the HI generator. This would further reduce the operating costs of chemical lasers using HI.

A fully portable apparatus 10 for producing HI efficiently, inexpensively and safely was constructed. The apparatus 10 relies on the chemical generation of HI by the reaction of two common industrial chemicals, namely iodine and tetrahydronaphthalene at a temperature of 210° C.

The generator produced 0.9 mmol/s of effluent HI. It should be usable with either CW or pulsed chemical lasers (e.g., HF, HCl, HBr). When the apparatus is not operational, no high pressure corrosive gases are present. This safety feature could stimulate further development of chemical lasers based on HI.

The above description refers to one specific form of apparatus, and method of operation, for generating gaseous HI. Modifications and changes will be apparent to those skilled in this art. For example, it is clear that a pump could be used instead of an inert gas to recirculate the liquid reactant/unreacted solution. Further, non-electric heating means could conceivably be used, such as a hot fluid jacket should a suitable source of the same be conveniently available.

Accordingly, it is intended to encompass all such modifications as would be apparent to practitioners in this art, and falling within the claims below.

The embodiments of the invention in which an exclusive property or privilege is claimed are defined as follows:

1. A method for generating a predetermined gaseous product, derived from chemically reacting at least two reactants, at least one of the reactants being in a liquid phase at ambient room conditions and at least one of the remaining reactants being in a solid phase at said ambient conditions, said method comprising:
   (a) introducing the reactant in liquid phase into a supply of the reactant in the solid phase, upon a demand for said gaseous product, at least some of the solid reactant dissolving into the liquid reactant to form a reactive solution;
   (b) percolating the reactive solution by the force of gravity through a vertically oriented reaction zone heated to a preselected temperature which is sufficiently high to promote the desired chemical reaction but below the boiling temperature of the solution, a predetermined chemical reaction occurring in the reaction zone to produce said gaseous product; and
   (c) removing said gaseous product from the reaction zone to another location where said product is in demand.

2. The method defined in claim 1, wherein the gaseous product is hydrogen iodide, the reactant in liquid phase is tetrahydronaphthalene and the reactant in solid phase is iodine.

3. The method defined in claim 1 or 2, wherein any nonreacted excess of the reactive solution is collected and recirculated back to the supply of reactant in solid phase, thus maintaining maximum quantities of solid reactant dissolved in the reactant in liquid phase.

4. The method defined in claim 1 or 2, wherein the reaction zone is heated to a temperature not exceeding about 210° C.

5. The method defined in claim 1 or 2, wherein an inert carrier gas is used to carry away the gaseous product.

6. The method defined in claim 1 or 2, wherein an inert carrier gas is provided under pressure to pressurize a supply container of said reactant in liquid phase, said pressure causing the liquid reactant to be introduced into the supply of solid reactant, said carrier gas also functioning to transport and carry away said gaseous product to the point of use.

7. The method defined in claim 1 or 2, wherein said gaseous product is hydrogen iodide produced from reacting solid iodine dissolved into liquid tetrahydronaphthalene, and transported for use in a chemical laser based on one of hydrogen fluoride, hydrogen chloride and hydrogen bromide.

8. An apparatus for generating a gaseous reagent, upon demand, from the chemical reaction of at least two reactants, at least one of the reactants being in a liquid phase at ambient room conditions and at least one of the other reactants being in a solid phase at said ambient room conditions, said apparatus comprising;
   (a) a first reservoir for containing the solid reactant and a second reservoir for containing the liquid reactant, said reservoirs being spaced apart vertically;
   (b) a reaction zone located intermediate the first and second reservoirs through which gravity driven percolation of a solution of the solid reactant dissolved in the liquid reactant occurs to enable said chemical reaction to occur, thereby producing said gaseous reagent;
   (c) heating means for providing heat to said reaction zone, said heating means being operative to maintain a temperature in said zone less than a temperature at which the solution would boil;
   (d) pressure controlling means for adjusting the pressure in said reaction zone; and
   (e) conduit and pumping means operable to convey said liquid reactant to said first reservoir, said conduit means including an arrangement for conveying said gaseous product to the point of use.

9. The apparatus defined in claim 8, wherein means are provided for recirculating any excess quantities of said solution back to the first reservoir.

10. The apparatus defined in claim 8, wherein the liquid reactant is tetrahydronaphthalene, the solid reactant is iodine and the gaseous product is hydrogen iodide.

11. The apparatus defined in claim 8, 9 or 10, wherein said reaction zone includes baffle means spaced apart in a manner so as to increase the dwell time of the solution in said reaction zone.

12. The apparatus defined in claim 8, 9 or 10, wherein the first and second reservoirs are interconnected by a pair of concentric tubular conduits arranged to space said reservoirs apart vertically, and wherein said reaction zone is defined by a heated region intermediate the concentric conduits.

13. A portable apparatus for generating gaseous hydrogen iodide on demand, by chemically reacting iodine and tetrahydronaphthalene (THN) in a liquid phase reaction, comprising:
   (a) a first reservoir for containing the iodine in a solid state;
   (b) a second reservoir for containing the THN in a liquid state, said reservoirs being spaced apart and interconnected by conduit means operative to enable the liquid THN to be delivered to the first reservoir on demand;
   (c) a tubular housing for containing at least a portion of said conduit means to define a reaction zone, said housing also being interconnected to the first and second reservoirs to define therewith a substantially closed system, the reaction zone including therein a heated porous packing through which a solution of iodine dissolved in the THN is percolated, thereby enabling the liquid phase reaction of the iodine and THN to proceed, thus generating the gaseous hydrogen iodide, the gaseous hydrogen iodide being conveyed away by a carrier gas to the point of use.

14. The apparatus defined in claim 13, wherein pumping means are provided, operable selectively to deliver a flow of the liquid tetrahydronaphthalene to the first reservoir.

15. The apparatus defined in claim 14, wherein said pumping means comprises a supply of an inert gas under pressure, said gas being operative to force the liquid tetrahydronaphthalene along said conduit means to the first reservoir, and for subsequently flushing the gaseous hydrogen iodide from the reaction zone to the point of use.

16. The apparatus defined in claim 8 or 13, wherein the conduit means is thermally insulated at least through the heated reaction zone, to ensure delivery of liquid tetrahydronaphthalene to the first reservoir.

17. The apparatus defined in claim 8 or 13, wherein the reaction zone is heated by electric heaters controllable to regulate the temperature in the reaction zone to a temperature of from about 170° C. to about 210° C.

18. The method according to claim 3, wherein said collected solution is cooled before being recirculated.

19. The apparatus defined in claim 8 or 13, wherein cooling means are provided for cooling the contents of said second reservoir.

20. The apparatus defined in claim 8 or 13, wherein cooling means are provided for cooling the contents of said first reservoir.

* * * * *